May 8, 1928.
H. SWOYER
1,669,268
CONNECTING ROD FOR LOCOMOTIVES
Filed April 17, 1925
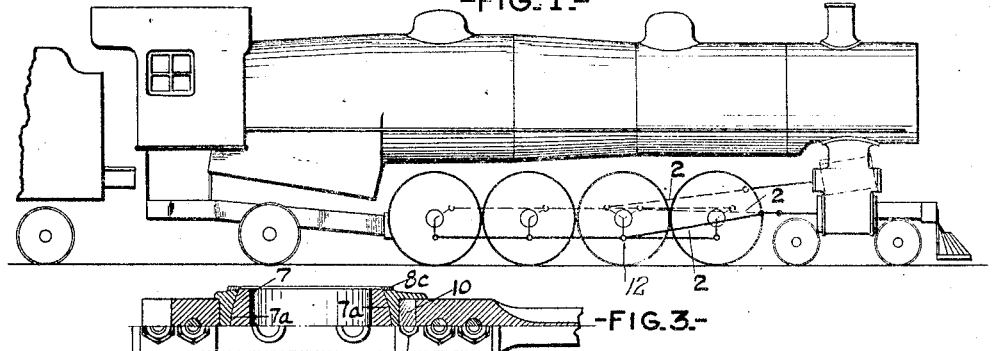
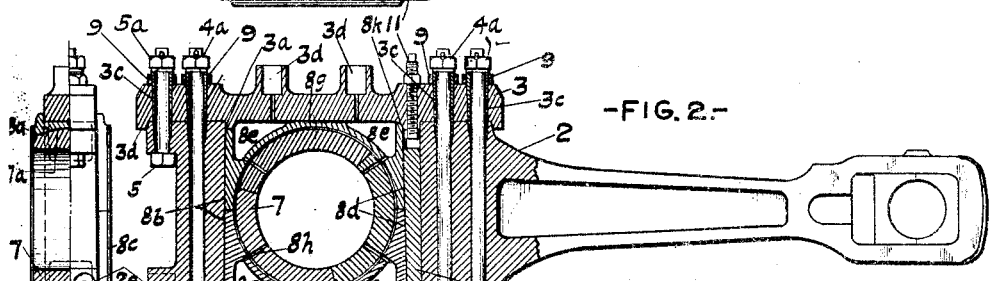
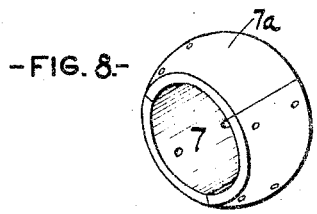
INVENTOR
Harry Swoyer
BY
Clarence A. Kerr
ATTORNEY Patented May 8, 1928.

1,669,268

UNITED STATES PATENT OFFICE.

HARRY SWOYER, OF DUNKIRK, NEW YORK.

CONNECTING ROD FOR LOCOMOTIVES.

Application filed April 17, 1925. Serial No. 23,956.

My invention relates to main rods as used on locomotive engines and has for its object an improvement in design whereby the distortion of the rod and the cramping of the back end crank pin bearing are relieved. Although primarily designed to meet the conditions of the center main rod of three-cylinder locomotives, my invention is equally applicable to the outside rods of both two and three-cylinder locomotives. As the back end of the main rod, by reason of its attachment to the main crank pin, is subject to movements resulting from lateral play and track irregularities, and its front end is attached to the crosshead which forms a part of the spring suspended structure of the locomotive, it is apparent that some provision for a limited amount of flexibility in the main rod is necessary in order to prevent the bearings from cramping on their pins when the rod is required to assume angular positions.

To meet these conditions I have provided a mechanism which is much simpler of construction and easier of manipulation than the mechanisms now in use, is productive of greater service from locomotives and at the same time results in decreased maintenance costs. The improvement claimed is hereinafter fully set forth.

In the accompanying drawings: Figure 1 is a side view, in elevation, of a locomotive, showing diagrammatically the application of the invention thereto; Fig. 2, a view, partly in vertical section, and partly in side elevation, of a main rod embodying the invention; Fig. 3, a plan view thereof, half in section; Fig. 4, a view, half in elevation, and half in section, of the rear end of the rod; Figs. 5 and 6, side elevations, respectively, of the rear end of the rod, and of the closure member for the opening in the upper side of the crank seat in the rod; and, Figs. 7, 8 and 9, perspective views, respectively, of the two piece bushing holder, of the crank pin bushing, and of one of the taper sleeves used to secure tightness in the bolt fastening.

In the practice of my invention, referring descriptively to the specific embodiment thereof which is herein exemplified, the main rod 2 in its back end $2^a$ has a seat $2^b$ for the crank pin bearing, which is open at the top. The top opening is closed by the closure member 3, secured to the rod 2 by the bolts 4, the drawing ends of which seat in tapered sleeves 6 in registering tapered apertures in the closure 3 and back end $2^a$. The crank pin bearing or bushing 7 is preferably comprised of a number of segments, three being shown in Fig. 8, and has its outer surface $7^a$ turned spherically to match the spherical inner surface $8^a$ of the holder 8, which as shown in Fig. 7, may be made in two parts meeting on its horizontal center line.

The closure member 3 has upon its under side two shoulders $3^a$ which have a bearing against the straight face upper portions $2^c$ of the sides of the rod seat $2^b$ and act to maintain the sides of the seat in the proper spaced relation, and the closure 3 in proper alignment with the opening and the back end of the rod. The closure member is also provided with end lugs $3^b$ which have a bearing against the inclined faces $2^d$ of the rod body.

The sleeves 6, which preferably have internal as well as external tapers, are inserted from the top through the tapered holes $3^c$ in the closure 3 and extend into the upper tapered portions of the bolt holes in the rod body, while the bolts 4 and 5 are inserted from the bottom of the rod body through the bolt holes and sleeves 6. It will be seen that as a bolt is drawn up by a nut $4^a$ or $5^a$, the tapered sleeve 6 will be forced downwardly and thus an extremely tight bolt connection will be formed which at the same time is one which can be readily disconnected. The interior of the sleeves is tapered throughout their length, the largest diameter being at the bottom edge $6^a$; while the exterior is tapered from the bottom edge to the thread $6^b$, the largest diameter being at the bottom of the threads. Overlapping slits $6^c$ and $6^d$ are provided to produce flexibility in the sleeves when they are forced downwardly into the tapered holes by the turning of the nuts $4^a$ and $5^a$ on the ends of the bolts, thus causing the sleeves to grip the bolts tightly. The upper extremities of the sleeves are threaded at $6^b$ for the application of nuts 9. It will be seen that the screwing down of the nuts 9 on the sleeves will tend to withdraw the sleeves 6 from their tapered holes $3^c$ and effect the loosening of the sleeves 6 upon the bolts 4 and 5.

As the bushing 7 is not secured to the holder 8 which surrounds it, it is free to turn with the crank pin by reason of its spherical outer face 7ª, while maintaining a correct fit of the bearing on the crank pin 12 and permitting the body of the rod meanwhile to turn freely with the rolling of the engine. The holder 8 which surrounds the bushing 7 and fits into the opening of the rod is somewhat narrower than the bushing 7, but its side faces are built out with rings 8ᶜ of a bearing metal so as to provide a more extended bearing for the bushing 7. The holder 8 has inclined or downwardly flaring faces 8ᵇ which converge toward the top of the holder, and also flanges 8ᵈ on all four sides, which overlap the sides of the rod and of the closure. In assembling the mechanism, as the holder 8 is split on its horizontal center line its lower half is first placed in the rod opening. The bushing is then assembled in position on the crank pin and the upper half of the holder is then applied. The lower portion of the rear face of the rod seat 2ᵇ is inclined slightly to the vertical, so that the bottom of the opening is wider than the top. A wedge 10 is inserted between the tapered forward face 8ᵇ of the holder 8 and the vertical face at the forward side of the seat 2ᵇ. Bearing upon the wedge 10 is the wedge bolt 11, the rotation of which when the closure 3 has been bolted on, moves the wedge 10 downwardly, which by reason of its wedging engagement between the forward face of the seat 2ᵇ and the tapered forward face 8ᵇ of the holder forces the holder rearwardly into snug engagement with the inclined face on the rod at the rear of the seat 2ᵇ thereby taking up all lost motion between the rod and holder.

In each corner of the holder 8 its edges 8ᵏ engage the closure 3 or rod 2 and form a triangular space which is utilized as a lubricant reservoir 8ᵉ into which lubricant may be fed from a grease cup 2ᵉ on the back of the rod or from cup 3ᵈ on the closure 3. Each reservoir has suitable communicating grooves 8ᶠ, 8ᵍ and 8ʰ for the reception and distribution of the lubricant.

My invention is particularly useful when applied to the center main rod of three-cylinder locomotives, since where it is desired to remove the rod for any purpose disconnection of the bolts 4 and 5 will permit the rod to be dropped away from the center crank pin. Further, when my invention is used for outside rods it is not necessary to disturb the eccentric crank pin, as in this case also the removal of the bolts 4 and 5 will permit the rod to be dropped directly away from the crank pin. The use of the spherical floating bushing contemplated with my improved structure results in a flexibility which produces a more efficient bearing contact on the pin by allowing the rod to oscillate to compensate for the rolling of the locomotive and so greatly diminish the need of bearing maintenance.

The invention claimed as new and desired to be secured by Letters Patent is—

1. A rod for locomotives for connecting a source of power to a driven axle, having at its rear end a horizontally and transversely extending aperture open from one side; a holder within said aperture; a closure for the open side of said aperture; a crank pin on the driven axle connected to the rod in said aperture; and means between crank pin and rod for permitting oscillatory movement therebetween.

2. A rod for locomotives for connecting a source of power to a driven axle, having at its rear end a horizontally and transversely extending aperture open from one side; a closure for the open side of said aperture; a crank pin on the driven axle connected to the rod in said aperture; means between crank pin and rod for permitting oscillatory movement therebetween; means for securing the closure to the rod body comprising flexible tapered sleeves seating in registering apertures in the closure and rod body, and bolts seating in said apertures and sleeves.

3. A rod for locomotives for connecting a source of power to a driven axle, having at its rear end a horizontally and transversely extending aperture open from one side; a closure for the open side of said aperture; a crank pin on the driven axle connected to the rod in said aperture; means between crank pin and rod for permitting oscillatory movement therebetween, said means comprising a floating bushing embracing the crank pin and having a spherical exterior; a two-part holder having a spherical inner surface engaging the spherical exterior surface of the bushing, the two parts of the holder meeting substantially on the horizontal axis of the rod.

4. A rod for locomotives for connecting a source of power to a driven axle, having at its rear end a horizontally-extending aperture open from one side; a closure for the open side of said aperture; a crank pin on the driven axle connected to the rod in said aperture; means between crank pin and rod for permitting oscillatory movement therebetween, said means comprising a floating bushing embracing the crank pin and having a spherical exterior; a two-part holder having a spherical inner surface engaging the spherical exterior surface of the bushing, the two parts of the holder meeting substantially on the horizontal axis of the rod, the holder having cavities for the supply of lubricant to the bushing and channels leading therefrom through the bushing, said cavities also having supply channels extending to the exterior of the mechanism.

5. A rod for locomotives for connecting a source of power to a driven axle, having at its rear end a horizontally-extending aperture open from one side; a closure for the open side of said aperture; a crank pin on the driven axle connected to the rod in said aperture; means between crank pin and rod for permitting oscillatory movement therebetween, said means comprising a floating bushing embracing the crank pin and having a spherical exterior; a holder having a spherical inner face engaging the spherical exterior surface of the bushing, the aperture having at least one of its fore and aft walls undercut, a wedge member between one of said walls and a vertically extending face of the holder; and means for drawing the wedge into tight engagement between said wall and said face and thereby locking the holder in the rod.

HARRY SWOYER.